Figure 1:
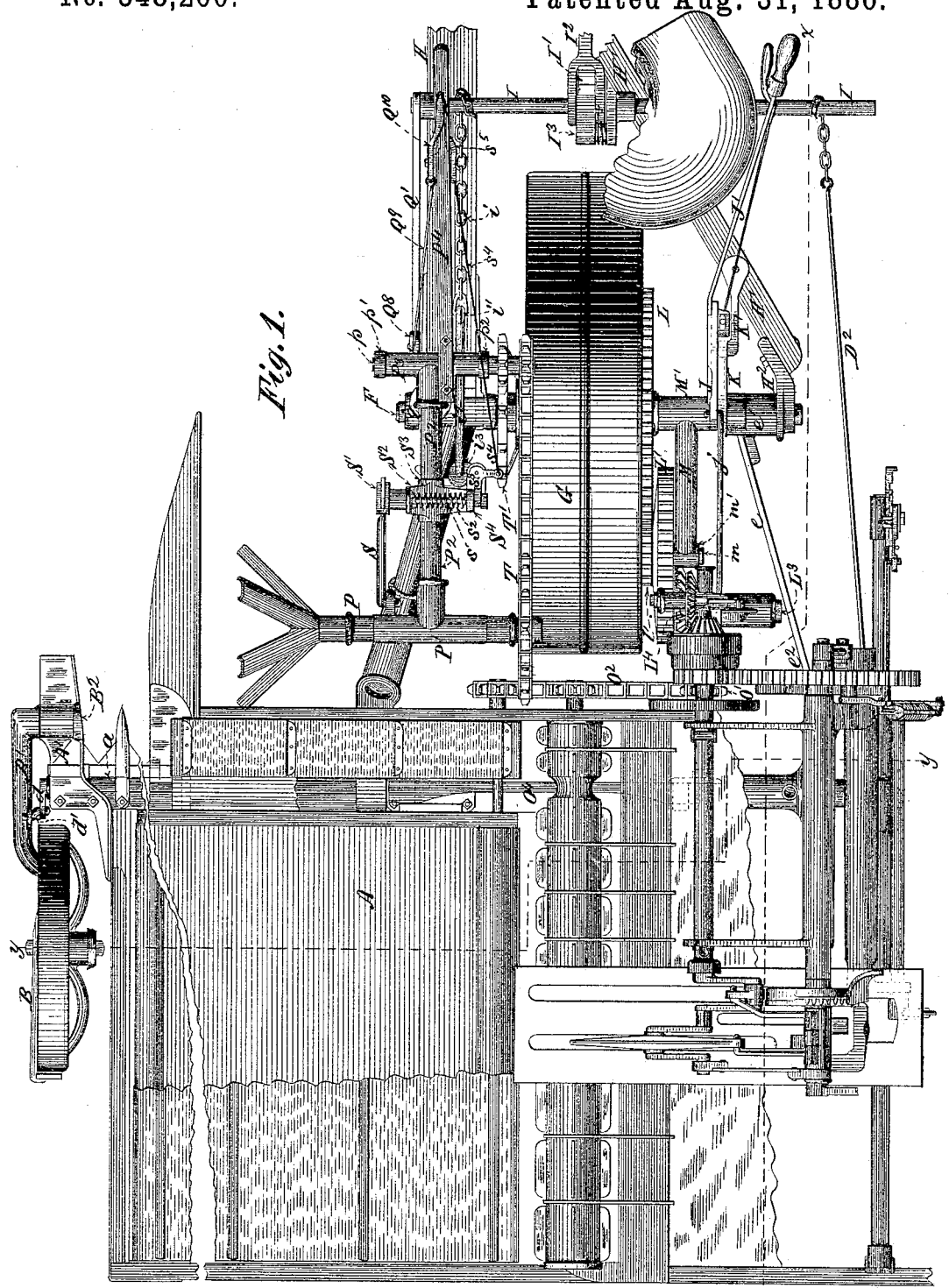

(No Model.) 7 Sheets—Sheet 1.

J. F. APPLEBY.
HARVESTER.

No. 348,260. Patented Aug. 31, 1886.

Witnesses:
Asa Farr
M. L. Adams

Inventor:
John F. Appleby,
Per Edw. E. Quimby,
Atty.

(No Model.) 7 Sheets—Sheet 5.
J. F. APPLEBY.
HARVESTER.
No. 348,260. Patented Aug. 31, 1886.
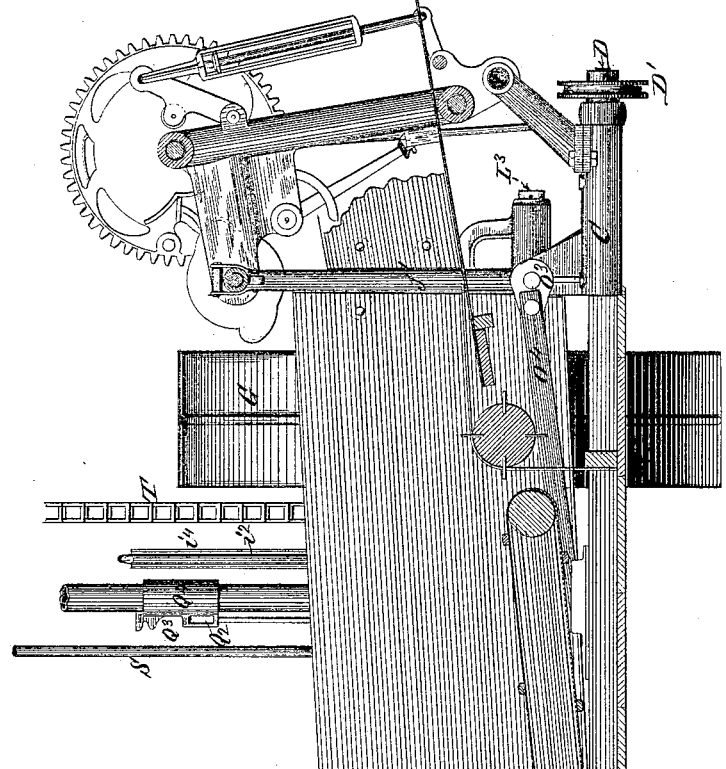
Fig. 5.
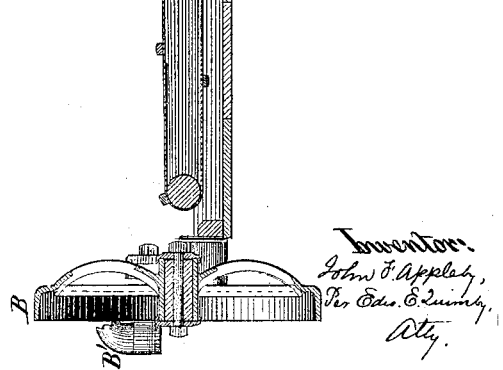
Witnesses:
Asa Farr
M. L. Adams.
Inventor:
John F. Appleby,
Per Edw. E. Quinby,
Atty.

(No Model.)  J. F. APPLEBY.  7 Sheets—Sheet 6.
HARVESTER.

No. 348,260.  Patented Aug. 31, 1886.

(No Model.)
J. F. APPLEBY.
HARVESTER.
No. 348,260. Patented Aug. 31, 1886.
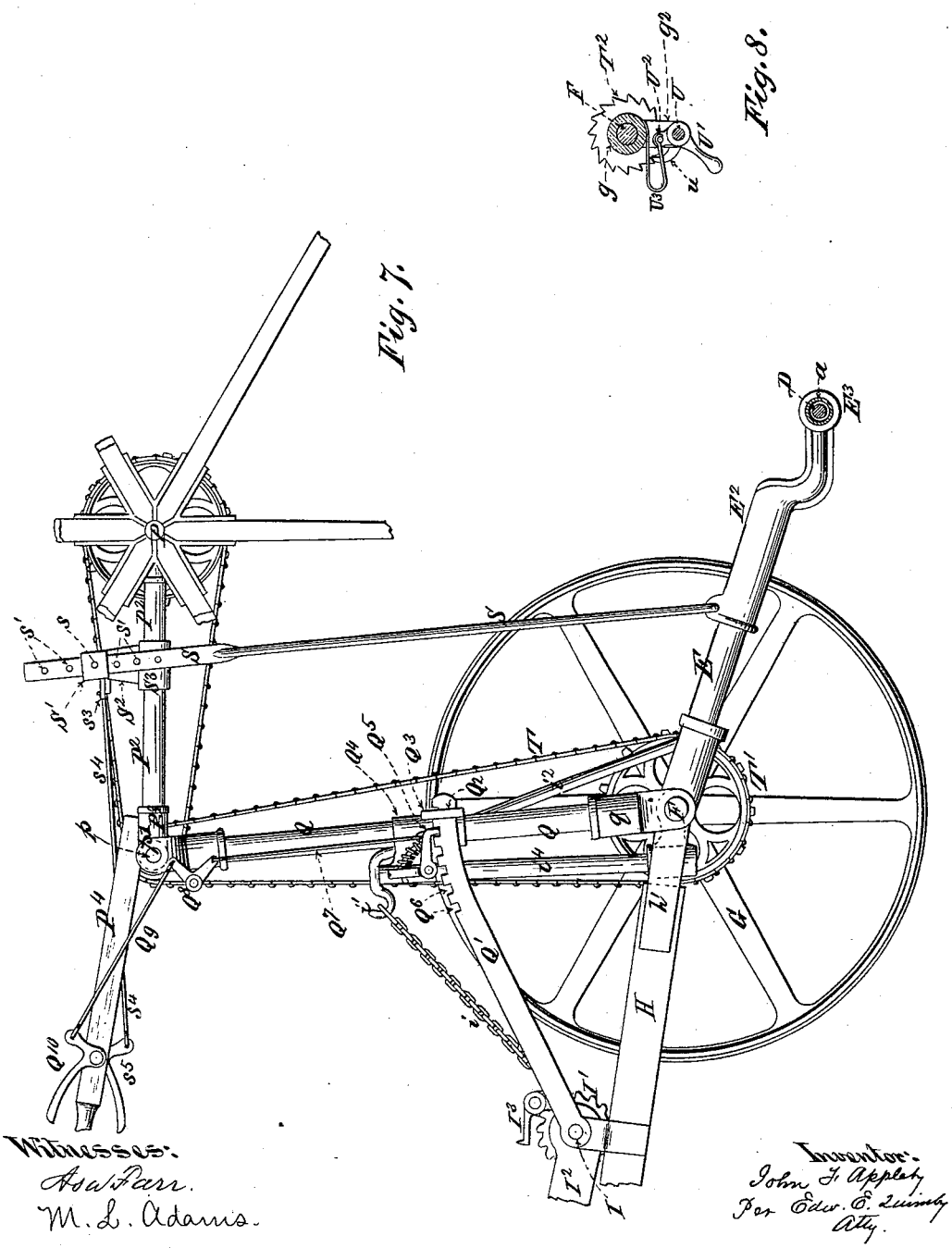

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

HARVESTER.

SPECIFICATION forming part of Letters Patent No. 348,260, dated August 31, 1886.

Application filed July 11, 1885. Serial No. 171,287. (No model.)

*To all whom it may concern:*

Be it known that I, JOHN F. APPLEBY, of Minneapolis, Minnesota, have invented certain Improvements in Harvesters, of which the following is a specification.

My improvements relate to the mode of supporting the harvester-platform upon the drive-wheel, and devices for raising, lowering, and tilting the platform, to the mode of supporting the reel, and to the arrangement of the gearing for transmitting from the drive-wheel power to actuate the various sub-mechanisms of the machine.

The characteristic features of my invention are as follows: The drive-wheel turns upon a dead-axle, the opposite ends of which are rigidly affixed to the forward ends of a lifting-arm and a brace-arm, which extend backward and downward, and are loosely hung at their rear ends upon the finger-bar, which is made tubular to permit the insertion through it of the rock-shaft, which controls the elevation of the grain side of the platform. The pole is hinged directly upon the dead-axle of the drive-wheel. The lifting-arm has a standard erected upon it, the top of which has an adjustable connection with the pole, so that by varying the length of this connection the lifting-arm may be rocked upon its pivotal connection with the pole, and the rear end of the lifting-arm, with which the platform is connected, be thereby raised or lowered. The device which is herein shown for varying the length of the connection between the pole and the top of the standard erected upon the lifting-arm is a windlass and chain. The windlass-shaft is mounted upon the pole in front of the drive-wheel, and the windlass-chain is led from the windlass-shaft backward and upward to the top of a standard erected upon the lifting-arm immediately in the rear of the pole. The end of the pole being held stationary the effect of taking up the windlass-chain upon the windlass-shaft is to rock the lifting-arm upward, and hence to elevate the platform, the unwinding of the windlass-chain having of course the contrary effect of permiting the lifting-arm to rock downward, and hence causing the lowering of the platform. As the lifting-arm and the brace-arm are both rigidly affixed to the dead-axle of the drive-wheel, the rocking of the lifting-arm involves the like rocking of the brace-arm. The elevation of the grain side of the platform is controlled by means of the rock-shaft extending through the hollow finger-bar, which at its grain end has a crank, which is connected by means of a link with the grain-wheel arm, the grain-wheel arm at its forward end having the usual horizontal pivotal connection with the divider, which pivotal connection constitutes the point of support for the grain side of the platform. At its stubble end this rock-shaft has fastened to it a sheave, upon which is wound a chain extending to the windlass-shaft. The stroke of the crank at the grain end of the rock-shaft and the diameter of the sheave at the stubble end are so proportioned that the raising or lowering of the stubble side of the platform is accompanied by a like raising or lowering of the grain side of the platform. To tilt the platform, there is provided a link connecting a standard erected upon the main frame of the harvester with a bell-crank lever pivoted in an arm loosely mounted upon the axle of the drive-wheel, but rigidly connected, by means of a brace, with the pole-brace, and consequently with the pole. To operate the bell-crank lever, a radius-bar is provided, and the bell-crank lever has pivoted to it the usual retaining-pawl, the tooth of which is adapted to engage notches in a curved rack formed in the concentrically-curved edge of the arm in which the bell-crank lever is pivoted. The swaying forward of this lever tilts the back of the platform upward, and the swaying backward of the lever tilts the back of the platform downward. During the operation of raising and lowering the platform its tilt is not altered. The lifting-arm and the brace-arm, extending from the axle to the finger-bar, the arm loosely mounted upon the axle, and the link connecting the bell-crank lever with the standard erected upon the main frame, constitute a quadrilateral jointed frame, which at times controls the tilt of the platform and prevents it from undergoing any change in inclination during the raising and lowering operation.

Another feature of my invention consists in the mode of transmitting power from the drive-wheel by means of intermediate gears affixed to a counter-shaft having its bearing in the end of an arm projecting radially from a hub loosely mounted upon the axle of the drive-wheel. One of the said intermediate gears is a pinion which meshes with the drive-wheel gear. The other one of the said intermediate gears is a spur-wheel, which drives a pinion secured to a horizontal shaft mounted in bearings in the main frame of the harvester. A suitably-crooked link or eye bar is loosely hung at its upper end upon the box in which the shaft of the intermediate gears has its bearing, and at its lower end upon the box forming a part of the main frame of the harvester, in which is journaled the shaft of the pinion driven by the intermediate spur-gear. By this mode of organization the intermediate gears are, during the raising, lowering, or tilting of the platform, constantly held in mesh, respectively, with the drive-wheel gear and with the pinion mounted in the main frame of the harvester. During the operation of adjusting the platform, the intermediate pinion rides up or down, as the case may be, upon the drive-wheel gear in the arc of a circle of which the arm in which its shaft has its bearings is the radius, and similarly the intermediate spur-wheel rides forward or backward upon the pinion mounted in the main frame of the harvester, by reason of the link-connection of its journal with the journal of the said pinion.

Another feature of my invention is that the reel-post is supported directly upon the axle of the drive-wheel, the reel being operated by means of a sprocket-chain from a sprocket-wheel loosely mounted upon the hollow hub of the drive-wheel. This sprocket-wheel is on the grain side of the spokes of the drive-wheel, and the drive-wheel gear, which is also loosely mounted upon the hollow hub, is on the stubble side of the spokes of the drive-wheel; and another feature of my invention consists in an adjustable pawl-shaft provided with two pawls, which are on opposite sides of the spokes of the drive-wheel, and are adapted to engage two ratchet-wheels, one affixed to the hub of the drive-wheel gear, and the other affixed to the hub of the sprocket-wheel which drives the reel, and, when so engaged, to cause the said ratchet-wheels to partake of the rotary motion of the drive-wheel when the harvester is drawn forward.

My invention also embraces certain minor details in the construction of devices for adjusting the reel.

Figure 2:
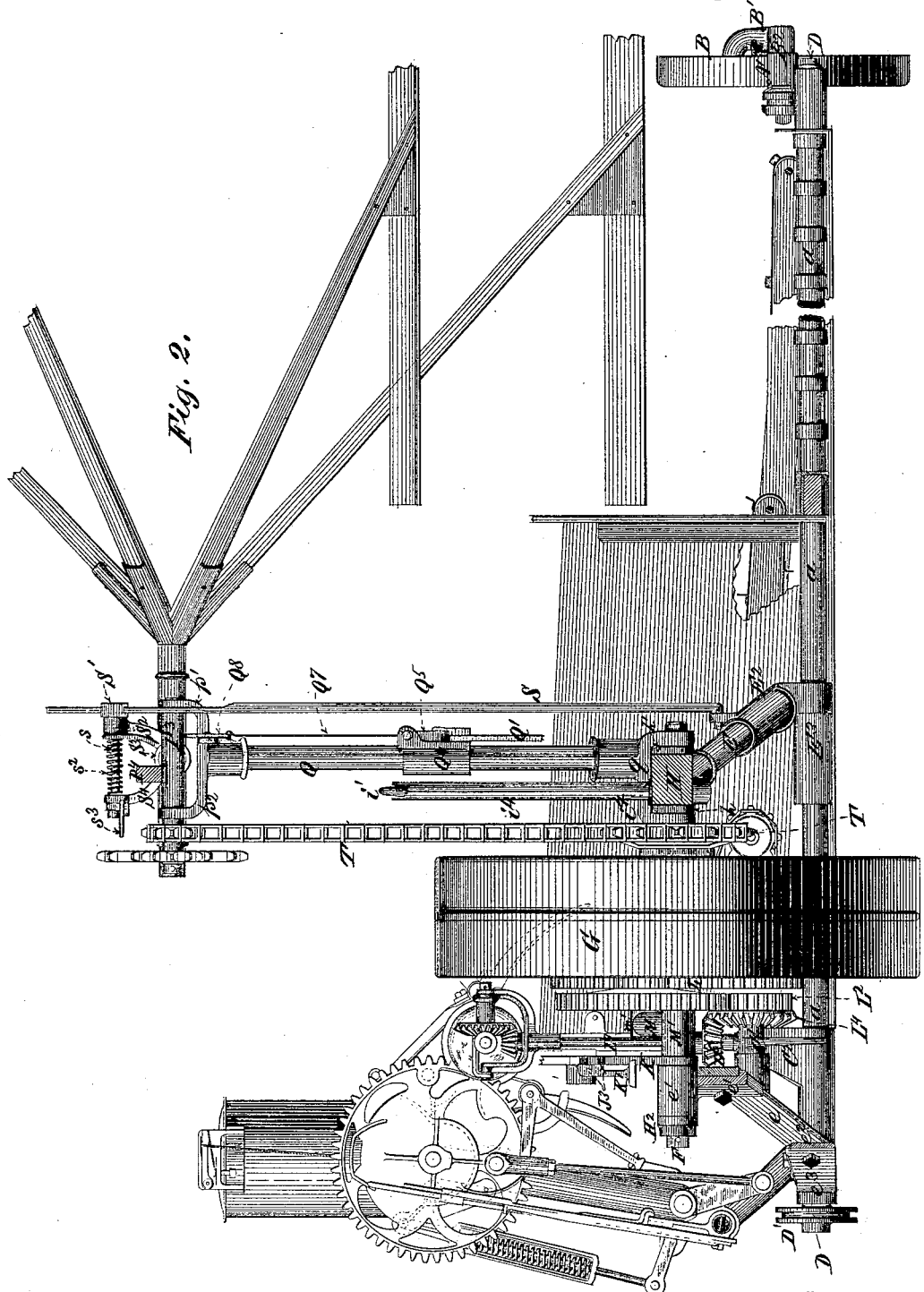
Figure 3:
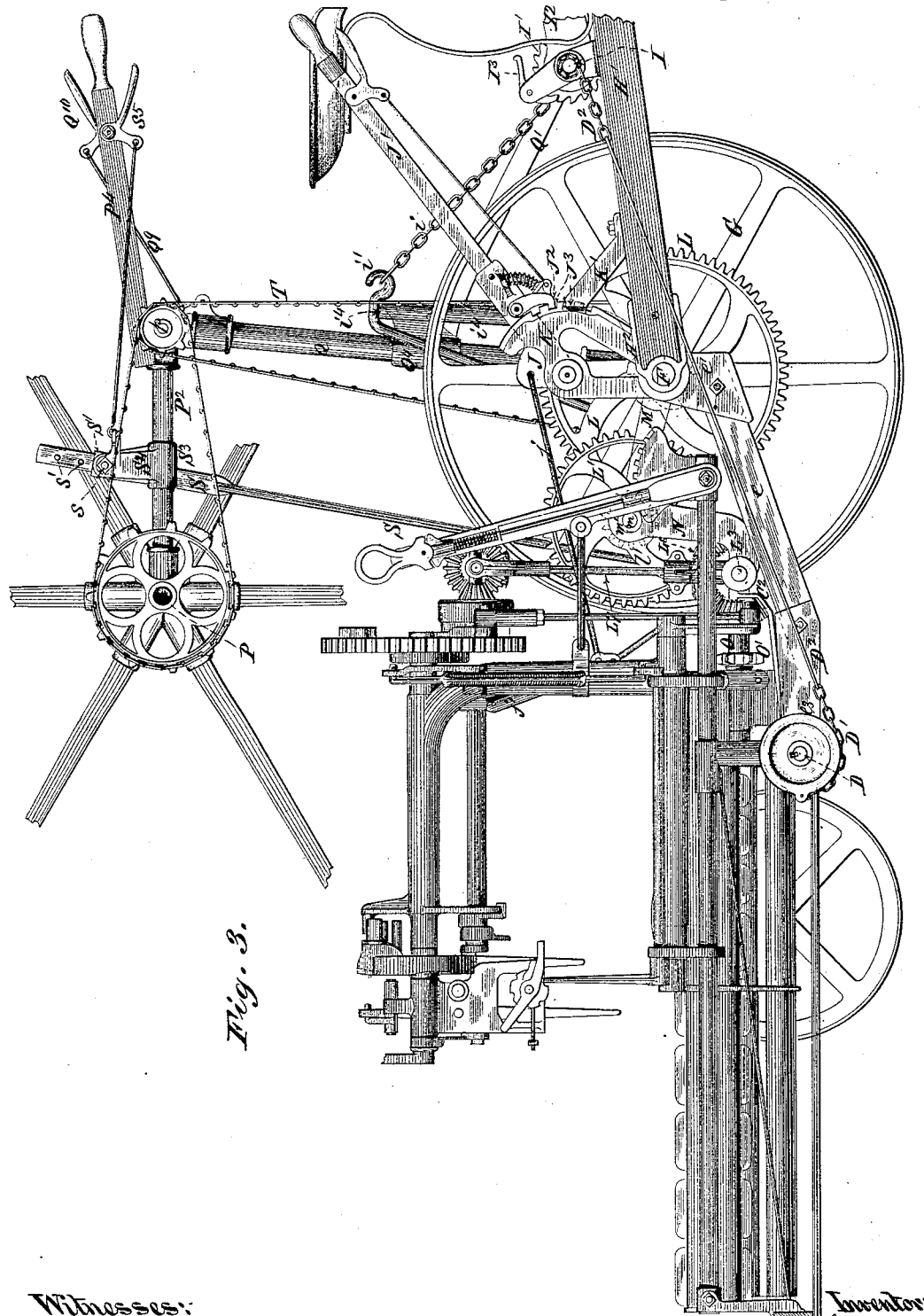
Figure 4:
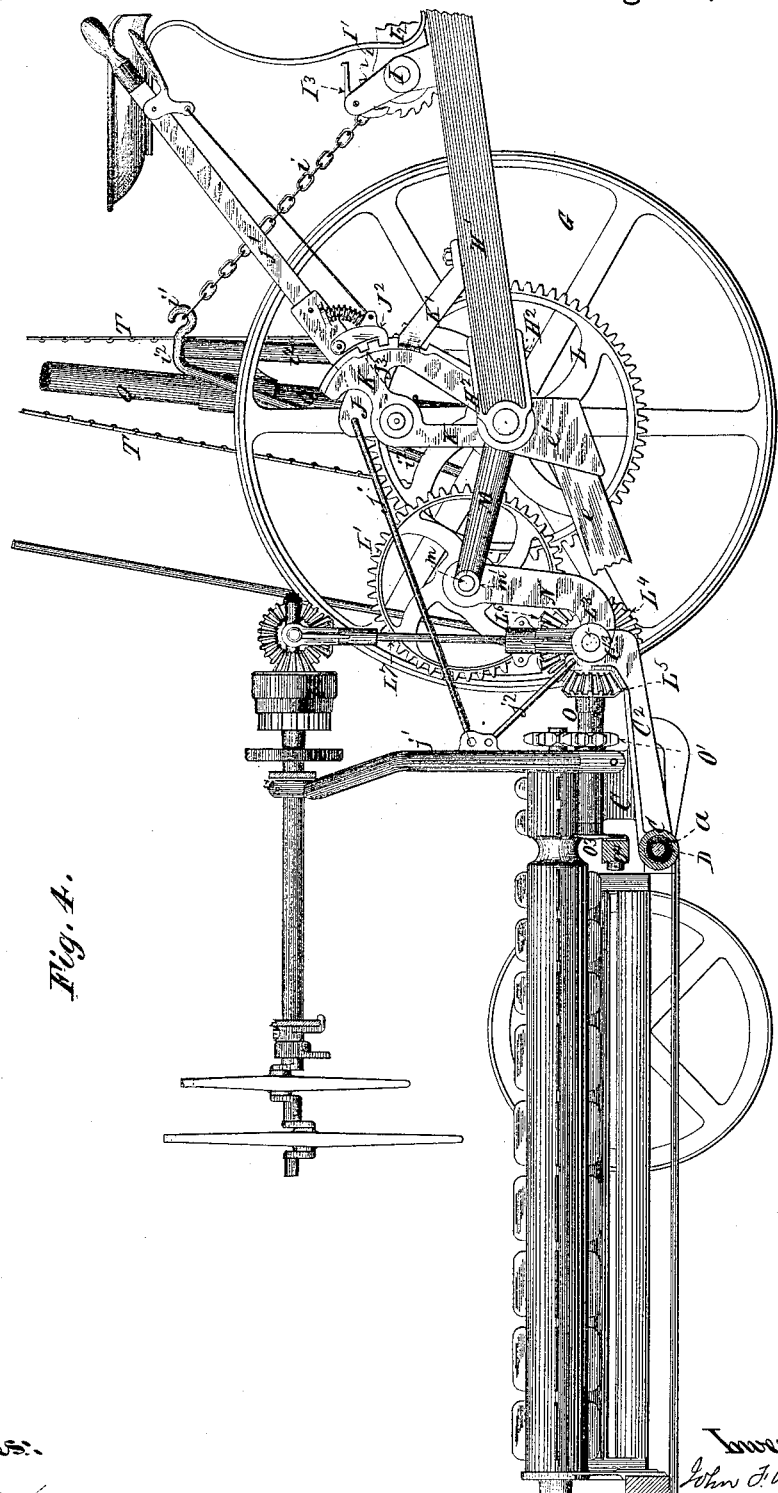
Figure 6:
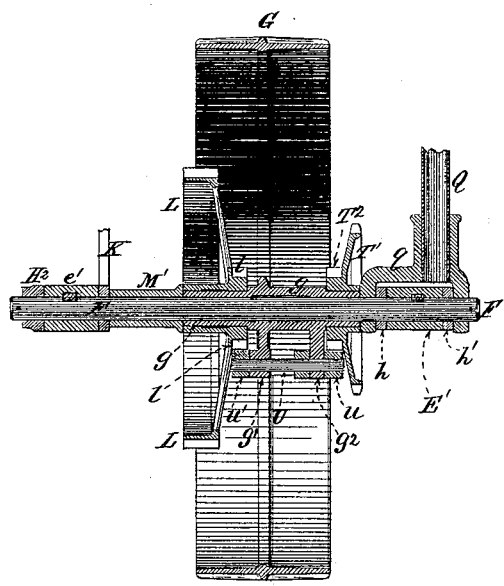

The accompanying drawings represent my improvements applied to a so-called "low-down" harvester and binder, and are as follows:

Figure 1 is a top view of the machine. Fig. 2 is a front elevation, the pole and the windlass thereon being omitted for the purpose of affording a clearer view of the other parts of the machine. Fig. 3 is an elevation of the stubble side of the machine, with the binder-deck omitted. Fig. 4 is a vertical section of the machine through the line $xx$ on Fig. 1. Fig. 5 is a vertical section of the machine, taken through the line $yy$ on Fig. 1. Fig. 6 is a central vertical section of the drive-wheel, showing the dead-axle in elevation and the parts mounted thereon in section, also showing the double-pawl shaft in elevation. Fig. 7 is an elevation of the grain side of the drive-wheel, showing the lifting-arm E in elevation and the tubular finger upon which the lifting-arm E is hung in cross-section. Fig. 8 is an elevation of the double-pawl lever, &c, showing the dead-axle of the drive-wheel in section.

The drawings represent a so-called "low-down" harvester and binder.

The binding apparatus illustrated in the drawings does not herein require description. It contains, however, certain peculiarities of construction which I have fully described in another pending application for a patent, Serial No. 170,927, filed July 8, 1885.

The platform A is supported at its grain side upon the usual grain-wheel, B, the grain-wheel arm B' having the usual horizontal pivotal connection, B$^2$, with the divider A'. The finger-bar $a$ is tubular, and at its stubble end is secured to the bed C of the main frame. A rock-shaft, D, extends entirely through the tubular finger-bar $a$, and through the bed C, and is provided at its grain end with the crank-arm $d$, linked by means of the link $d'$ to the grain-wheel arm B'. At its stubble end the rock-shaft D is provided with the sheave D', to which is attached the chain D$^2$, which extends forward and upward to the windlass-shaft I. When being tilted, the platform rocks upon the axle of the grain-wheel and in the bearings afforded by the perforated rear ends of the lifting-arm E and the brace-arm $e$, the forward ends of which are rigidly secured, respectively, to the hubs E' $e'$, keyed to the dead-axle F of the drive-wheel G, as shown in Fig. 6. The rear end, E$^2$, of the lifting-arm E upon the grain side of the drive-wheel is affixed to the hub E$^3$, which is loosely mounted upon the tubular finger-bar through which the rock-shaft D is inserted. The rear end, $e^2$, of the brace-arm $e$ upon the stubble side of the drive-wheel is affixed to the hub $e^3$, loosely mounted upon the extension of the finger-bar between the bed C and the sheave D'. The pole H at its rear end is affixed to the two hinge-plates $h$ $h'$, which are loosely hung upon the dead-axle F, respectively upon opposite sides of the hub E' of the lifting-arm E. The diagonal pole-brace H' is affixed at its forward end to the pole, and at its rear end to the hinge-plate H$^2$, loosely mounted upon the dead-axle F, outside the hub $e'$, with which the brace-arm $e$ is rigidly connected. The windlass for raising and lowering the platform is supported upon the pole and pole-brace. It consists of the horizontal shaft I, to which is affixed the usual ratchet-wheel, I', and which is operated by means of the actuating pawl-lever I$^2$, provided with the retaining-pawl I$^3$. A chain, $i$, affixed to the grain end of the windlass-shaft I, extends backward and upward therefrom, and is connected to the hook $i'$ at the upper end of the link-bar $i^2$, the lower end, $i^3$, of which is rigidly connected with the lifting-arm E. The upper portion of the link-bar $i^2$ bends laterally forward, and is supported upon the upper end of the post $i^4$, the base of which is rigidly connected with the hub E' of the lifting-arm E. The link-bar and post serve as a standard erected upon the lifting-arm E. By this organization, when the forward end of the pole is held down, and the windlass-shaft so turned as to wind up the windlass-chain $i$ upon it, the lifting-arm E is rocked upward, and as the lifting-arm E is rigidly fastened to the dead-axle F, to which the lifting-arm E is also rigidly connected, the brace-arm $e$ is in like manner rocked upward, thus elevating the platform. Correspondingly the unwinding of the chain $i$ from the windlass-shaft I has the effect of lowering the platform.

The winding up on the windlass-shaft I of the chain $i$ is accompanied by a like winding up on the shaft of the chain $D^2$, thus unwinding the chain $D^2$ from the sheave D', and rocking the rock-shaft D in the proper direction to enable it, by means of the link-connection of its crank-arm $d$ with the grain-wheel arm B', to elevate the grain-wheel side of the platform to the same extent as that to which the stubble side is elevated.

The tilting of the platform is effected by means of the bell-crank lever J, to which is affixed the operating-lever J', provided with the retaining-pawl $J^2$, adapted to engage the notches $J^3$, formed in the concentrically-curved edge of the standard K, loosely mounted upon the dead-axle F, but rigidly secured by means of the brace K' to the pole-brace H'. The bell-crank lever J is flexibly connected by the link $j$ with the standard $j'$, erected upon the bed C of the main frame. The standard $j'$ is braced by means of the inclined brace-arm $j^2$, extending from the standard $j'$, immediately below its point of connection with the link $j$, to a part of the main frame of the harvester.

The swaying backward or forward of the operating-lever J', by reason of the link-connection of the bell-crank lever J with the standard $j'$, causes the standard $j'$ to be rocked backward or forward, and the platform to be tilted downward or upward, as the case may be.

The main train of gearing for transmitting power from the drive-wheel consists, first, of the drive-wheel gear L, loosely mounted upon the hub $g$ of the drive-wheel G, and having affixed to its grain side the ratchet-wheel $l$; secondly, of the intermediate spur-wheel, L', having affixed to its grain side the pinion $l'$, which inmeshes with the drive-wheel gear. The intermediate spur-wheel and pinion are affixed to a counter-shaft, $m$, having its bearing in the trunnion $m'$, projecting laterally from the end of the swinging arm M, radially affixed to the hub M', loosely mounted upon the dead-axle F, between the hub of the drive-wheel gear and the standard K.

The intermediate gears are self-adjusting, and during the operations of raising, lowering, or tilting the platform, the arm M swings upon the axle of the drive-wheel gear, thus moving the pinion $l'$ in the arc of a circle, and keeping it in mesh with the drive-wheel gear.

The spur-wheel L' drives a pinion, $L^2$, affixed to the counter-shaft $L^3$, having its bearing in the box C', formed in the upwardly-turned end of the arm $C^2$, projecting forward from and cast in one piece with the bed C of the main frame.

The preservation of the mesh of the intermediate spur-wheel, L', with the pinion $L^2$ during the operations of raising, lowering, or tilting the platform is effected by means of the crooked link or eye bar N, the upper end of which is hung upon the trunnion $m'$, in which the counter-shaft has its bearing, and the lower end upon the box C'. The pinion L' has affixed to it the bevel spur-wheel $L^4$, which drives the bevel-pinion $L^5$, affixed to the counter-shaft O, provided with the sprocket-wheel O' for supporting the sprocket-chain $O^2$, by which the platform carrier-belt is operated. The counter-shaft O has affixed to its rear end the crank $O^3$, which, by means of the usual pitman, $O^4$, imparts reciprocating motion to the sickle. In the type of machine shown in the drawings, the bevel spur-wheel $L^4$ is also employed to drive the bevel-pinion $L^6$, connected with the lower end of a vertical shaft, $L^7$, through which motion is transmitted for operating the binding mechanism.

My reel-shaft P has its bearing in the horizontal box P', affixed to the rear end of the rocking arm $P^2$, the forward end of which is secured to the sleeve $P^3$, loosely mounted upon the horizontal shaft $p$, seated in bearings formed in the opposite branches, $p'$ and $p^2$, of the yoke, to which the upper end of the swaying reel-post Q is affixed. The lower end of the reel-post is secured to another yoke-piece, $q$, the branches of which are loosely hung upon the dead-axle F, respectively upon opposite sides of the hinge-plates $h$ and $h'$, to which the rear end of the pole is affixed. A rack-bar, Q', is hinged at its forward end to the pole, from which it projects upward and backward, and at its rear end is inserted through the guide-slot $Q^2$, formed in the flange $Q^3$, projecting from the collar $Q^4$, to which is pivoted the spring-retaining pawl $Q^5$ for engaging some one of the notches $Q^6$ $Q^6$, &c., formed in the upper edge of the hinged rack-bar Q'. The collar $Q^4$ is rigidly fastened to the reel-post.

The spring-retaining pawl $Q^5$ is operated in the usual manner by means of the link $Q^7$ connecting it with the bell-crank lever $Q^8$, pivoted to the upper part of the reel-post, and the link $Q^9$, connecting the bell-crank lever $Q^8$ with the bell-crank lever $Q^{10}$, pivoted to the forward end of the lever $P^4$, the rear end of which lever is fastened to the sleeve $P^3$. The reel is raised or lowered by rocking the sleeve P³ on the shaft $p$, and is sustained in any position to which it may have been adjusted by the engagement of the horizontal pin $s$ with one or other of the holes $s'$ in the brace-rod S, the lower end of which is pivoted to the lifting-arm E'.

The upper end of the brace-rod S is inserted through a swiveling guide, S', provided with a horizontal bearing in the arm S², projecting upward from the collar S³, affixed to the swinging arm P². Another arm, S⁴, projecting upward from the collar S³, is perforated to admit the pin $s$, which extends through the hollow shaft of the swiveling guide S', and thereby is held in proper alignment to enter the holes in the upper end of the brace-rod. An expanding spiral spring, $s^2$, at one end fastened to the pin $s$, and at the other end exerting its thrust against the arm S⁴, tends to thrust the pin toward the side of the brace-rod, and through such one of the holes in the brace-rod as may have been brought opposite to it by the swinging upward or downward of the arm P². The withdrawal of the pin is effected by means of the bell-crank lever $s^3$, pivoted to an ear projecting laterally from the arm S⁴, and connected by means of a link, $s^4$, with the bell-crank lever $s^5$, pivoted to the forward end of the lever P⁴.

Power to rotate the reel is transmitted by the sprocket-chain T from the sprocket-wheel T', loosely mounted upon the hub $g$ of the drive-wheel, and having affixed to it the ratchet-wheel T². The connection with the drive-wheel of the ratchet-wheel T², and the connection of the ratchet-wheel T² with the ratchet-wheel $l$, affixed to the drive-wheel gear L, is effected by means of the pawls $u$ and $u'$, affixed to the opposite ends of the pawl-shaft U, having one of its bearings in the web $g'$, uniting two of the spokes of the drive-wheel, and having its other bearing in the lug $g^2$, projecting radially from the hub $g$ of the drive-wheel. The pawl-shaft U has affixed to it the bell-crank operating-lever U'. The short arm U² of the bell-crank lever U' has affixed to it one leg of the expanding U-shaped spring U³, the other leg of which is secured to the hub $g$, the expanding thrust of this spring being so exerted upon the bell-crank lever as to hold the pawl-shaft stationary both when the pawl $u$ and $u'$ are thrown out of engagement with the ratchet-wheels T² and $l$, and also to hold it stationary when the pawls are in engagement with the ratchet-wheels.

It will be seen that it is only when the machine is being pulled forward, when the pawls $u$ and $u'$ are in engagement with the ratchet-wheels T² and $l$, that the rotary motion of the drive-wheel is imparted to the gear, and that the disconnection of the gearing with the ratchet-wheels is instantly effected by rocking the pawls out of engagement with the ratchet-wheels.

I claim as my invention—

1. In mechanism for raising and lowering harvester-platforms, a lifting-arm connected at its rear end with the platform, and having its forward end supported by the drive-wheel and pivotally connected with the rear end of the pole, a standard erected upon the lifting-arm, with an adjustable connection extending from the top of the said standard to the pole, and means for varying the length of the said connection and thereby rocking the said lifting-arm upon its pivotal connection with the pole, and raising or lowering the rear end of the lifting-arm connected with the platform.

2. A lifting-arm connected at its rear end with the platform and having its forward end supported on the drive-wheel and pivotally connected with the rear end of the pole, a standard erected upon the lifting-arm, and a chain extending from the top of the said standard to a windlass-shaft mounted upon the pole, and an operating pawl lever and ratchet for winding or unwinding the chain upon or from the said windlass-shaft, and thereby rocking the said lifting-arm upon its pivotal connection with the pole and raising or lowering the rear end of the lifting-arm and the platform connected therewith.

3. The combination, as herein set forth, of a dead-axle for a drive-wheel, a lifting-arm affixed to the grain end of the said axle and extending backward to and connected with the platform, and having a standard erected upon it, a brace-arm affixed to the stubble end of the said axle and also extending backward to and connected with the platform, a pole hinged to the said axle, a windlass-shaft mounted upon the pole, two windlass-chains, one connected with the grain end of the windlass-shaft and with the top of the said standard, and the other chain connected with the stubble end of the said shaft, and with a sheave for operating a rock-shaft extending across the machine and provided upon its grain end with a crank linked to the vertically-adjustable grain-wheel arm.

4. In mechanism for tilting the platform of a harvester, an adjustable bell-crank lever pivoted to an arm rigidly fastened to the pole-brace and consequently to the pole, and a link connecting the said bell-crank lever with a standard erected upon the main frame of the harvester.

5. The herein-described train of gearing for transmitting from the drive-wheel power to operate the sickle and other mechanisms supported by the platform, the same consisting of the drive-wheel gear, and an intermediate pinion and spur-wheel affixed to an intermediate shaft journaled in the end of a rocking arm whose axis is in alignment with the axis of the drive-wheel gear, and a link or eye bar connecting the journal of the intermediate shaft and the journal of a shaft mounted in the main frame of the harvester, for the purpose of preserving the mesh of the drive-wheel gear with the intermediate pinion and of the intermediate spur-wheel with the pinion which it drives during the operations of raising, lowering, or tilting the platform.

6. The drive-wheel provided with a hollow hub turning upon a dead-axle, the drive-wheel gear loosely mounted upon the hub of the drive-wheel upon one side of the spokes thereof, and a sprocket-wheel loosely mounted upon the hub of the drive-wheel upon the other side of the spokes thereof, and an adjustable pawl-shaft supported in bearings connected with the drive-wheel and provided with two pawls, in combination with ratchet-wheels affixed respectively to the said sprocket-wheel and to the said drive-wheel gear, and a spring for holding the said adjustable pawl-shaft stationary in prescribed positions, as set forth.

JOHN F. APPLEBY.

Witnesses:
M. L. ADAMS,
R. C. HOWES.